Aug. 7, 1923.

1,464,101

M. LUCKIESH
COATING FOR ELECTRIC LAMPS
Filed Nov. 6, 1919

INVENTOR:
MATT LUCKIESH,
BY Albert G. Davis
HIS ATTORNEY.

Patented Aug. 7, 1923.

1,464,101

UNITED STATES PATENT OFFICE.

MATT LUCKIESH, OF CLEVELAND, OHIO, ASSIGNOR TO GENERAL ELECTRIC COMPANY, A CORPORATION OF NEW YORK.

COATING FOR ELECTRIC LAMPS.

Application filed November 6, 1919. Serial No. 336,194.

*To all whom it may concern:*

Be it known that I, MATT LUCKIESH, a citizen of the United States, residing at Cleveland, in the county of Cuyahoga, State of Ohio, have invented certain new and useful Improvements in Coatings for Electric Lamps, of which the following is a specification.

My invention relates to compositions of matter and to methods of applying a superficial coating to a glass surface, more particularly to lamp bulbs although glass reflectors, windows and such surfaces are included.

Heretofore, superficial coatings which have been applied to glass surfaces have not been permanent. If applied to a lamp bulb, the coating would fade, burn or evaporate very quickly. These coating materials were easily scratched and marred. Moreover, such coatings when dirty, could not be satisfactorily washed.

With the coatings of my invention applied according to my method, a superficial coating applied to any glass surface is practically permanent. It will resist practically any mechanical abrasion likely to be encountered in service and can be scratched or scraped only by deliberate effort with a sharp knife or similar tool. It will not chip off and repeated tests have shown it to be proof against deterioration by acid fumes. The coated surface may be washed in boiling water without damage to the coating. Even when applied to lamp bulbs, the coating will not discolor or fade.

I secure these advantages by using inorganic ingredients which are rendered impervious to water. By proper application of the composition a coating is produced on the glass surface which is smooth and so does not readily catch dirt. Inasmuch as the coating is readily applied, various designs may be easily produced by means thereof upon lamp bulbs, glass reflectors and other such glass surfaces.

Figure 1:
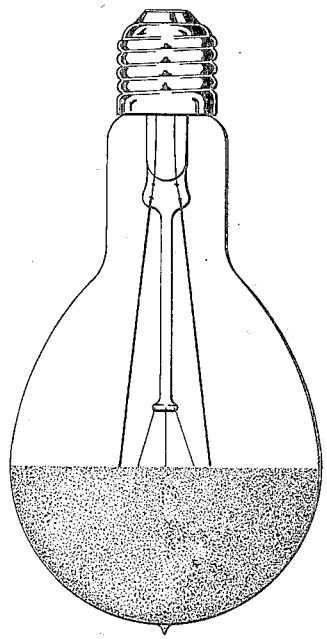
Figure 2:
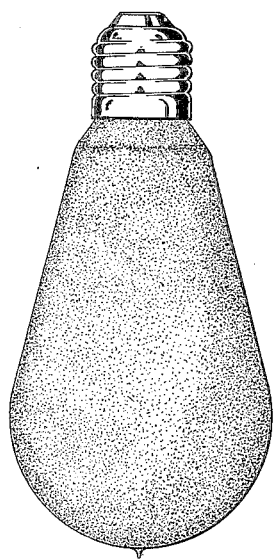
Figure 3:
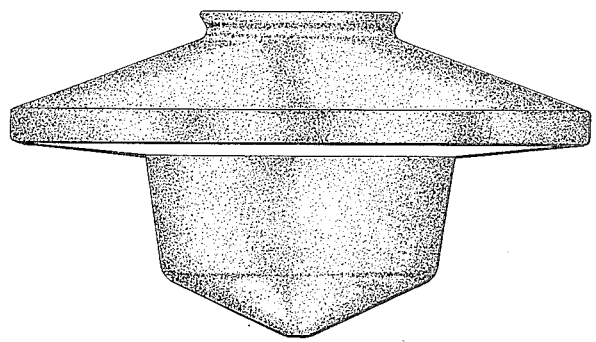

My invention may be more fully understood by referring to the accompanying drawing in which Fig. 1 is a lamp which has a coating applied to the bowl thereof according to my invention; Fig. 2 is a lamp whose bulb is completely coated; and Fig. 3 is a glass reflector having a coating of my composition.

For the composition of matter which I use for producing a superficial opal coating on glass surfaces, I prefer to use the following mixtures:

Mixture A.

(Proportions by weight.)

French chalk (talc) _____ 5
Zinc oxide _____ 5
Sodium silicate (sp. gr. 1.375) _____ 15
Water _____ 8

Mixture B.

Dammar varnish made very thin by the addition of turpentine.

According to one method of preparation, which I have found efficacious, Mixture A is ground in a ball-mill from eight to twelve hours in order to produce a very finely divided mixture. Care should be exercised to avoid impurities in the mixture. Sodium silicate absorbs water until it become flaky and so it is advantageous to ball-mill Mixture A without the sodium silicate, or at least, with only a portion of the silicate. The proper amount may be added after the ball-milling, or a few minutes before the ball-milling is completed. Mixture A deteriorates and should always be used fresh. Large quantities may be ball-milled without the sodium silicate and the latter may be added just before using. The amount of water used depends upon the specific gravity of the sodium silicate and may even be dispensed with if the specific gravity of the silicate is sufficiently low.

Mixture A is sprayed upon the glass surface with an air-brush or may be painted on with a fine-hair brush. After a few minutes the coating becomes very hard and adheres so firmly that it is difficult to scrape off with a knife. Mixture B is then applied with a fine-hair brush and is wiped off immediately with a clean cloth or the surface may be dipped into Mixture B and wipe off. The purpose of Mixture B is to prevent the flaking of sodium silicate by preventing it from absorbing moisture. The varnish coat should be very thin and the thinness will depend upon the method of application.

An opal coating produced by the successive application to a lamp of Mixtures A and B as shown in Fig. 1 produces a very dense light-transmitting and highly reflecting covering for the bowl of the lamp. Less light is transmitted by the opal coating than would necessarily have to be transmitted if the lamp bulb itself were made of opal glass since the opal coating acts also as a reflector to re-direct the light out through the clear glass portion of the lamp bulb while the only light given off by a lamp with an opal-glass bulb must come through the opal-glass which therefore cannot be very dense. An advantage of a dense coating on the bowl of a lamp bulb is that it reduces the direct glare of the lamp. In this respect the bowl-coated lamp is far superior to the bowl-frosted lamp. The opal coating may be applied to any portion of the surface of the lamp to produce any similar effect desired by the operator.

When a heavy coating of Mixture A covered with Mixture B is placed on the bowl of an incandescent lamp, the lamp may be used in an open reflector with practically no direct glare. When such a lamp as shown in Fig. 1 is used with an open reflector, the lower part of the lamp becomes virtually a semi-direct bowl which serves the same purpose as is being accomplished at present by the use of the opal cap, that is, the surface of the coating in contact with the glass of the lamp bulb acts as a reflecting surface to re-direct the light rays toward the reflector. However, the superficial coating of my invention has the advantages over the opal cap that it is cheap, is unaffected by dirt, and is permanently attached to the lamp in the proper relation thereto.

While the superficial coating of my invention as set forth in Mixture A is suitable for a heavy opal coating when applied as desired, for tinted lamps I apply a thinner mixture in a different manner.

For a yellow tint I use the following mixture:

*Mixture C.*

(Proportions by weight.)

French chalk or talc _____ 26
Burnt sienna (dry) _____ 13
Sodium silicate (sp. gr. 1.365) _____ 37
Water _____ 24

This mixture is prepared similarly to Mixture A.

The portion of the glass surface to be tinted is sand-blasted and Mixture C is rubbed on and the surface quickly wiped off with a dry cloth. As soon as dry, Mixture B is applied as before. This tinted superficial coating is substantially smooth and does not catch dirt although it may easily be cleaned with hot or cold water without injury. Various designs may be placed upon the glass surface by removing with acid the desired portions of the Mixture C coating before Mixture B has been applied or by other means.

It is obvious that in Mixture A, other white pigments besides zinc oxides may be used and it is also obvious that various insoluble coloring media can be used to produce tints. French chalk is only one form of hydrous magnesium silicate and any other form may be used successfully. The proportions of Mixtures A and C may be substantially varied to suit the needs or desires of the operator without impairing the qualities of the resultant coating.

What I claim as new and desire to secure by Letters Patent of the United States is:—

1. An incandescent lamp having a coating thereon comprising a composition of matter containing sodium silicate, talc and an insoluble coloring medium covered by a thin film of varnish.

2. An incandescent lamp having thereon a coating comprising an alkaline silicate and a hydrous insoluble earthy silicate.

3. An incandescent lamp having thereon a coating comprising an alkaline silicate and talc.

4. An incandescent lamp having thereon a coating comprising sodium silicate, talc and a metallic oxide.

5. An electric lamp comprising a bulb having thereon a coating comprising an alkaline silicate and a hydrous insoluble earthy silicate.

6. An electric lamp comprising a bulb having thereon a coating comprising sodium silicate and a hydrous insoluble earthy silicate.

In witness whereof I have hereunto set my hand this 3rd lay of November, 1919.

MATT LUCKIESH.